United States Patent

[11] 3,556,016

[72] Inventors Jean Pomagalski
 La Tronche;
 Francis Tauzin, Veyrins, France
[21] Appl. No. 766,819
[22] Filed Oct. 11, 1968
[45] Patented Jan. 19, 1971
[73] Assignees Jean Pomagalski S. A.,
 Fontaine, France
 Sigma Plastique, Veyrins, France,
 both corporations of France
[32] Priority Dec. 5, 1967
[33] France
[31] No. 131.059

[54] TELPHER CAR
 3 Claims, 4 Drawing Figs.
[52] U.S. Cl........................................ 105/150,
 104/173
[51] Int. Cl....................................... B61b 3/00,
 B61b 7/00
[50] Field of Search............................ 104/173;
 105/148, 150

[56] References Cited
UNITED STATES PATENTS
3,347,173 10/1967 Carlevaro........................ 104/173
FOREIGN PATENTS
1,454,500 8/1965 France........................... 104/173

Primary Examiner—Arthur L. La Point
Assistant Examiner—Robert Saifer
Attorney—Linton & Linton ABSTRACT: A telpher car including a mechanism for controlling the automatic opening and closing of the shell-like doors which is composed of an actuating roller fixed to a rigid control lever disposed outside of the car and adapted to be actuated by fixed ramps, symmetrical linkage means connecting said control lever to said doors and to a plate rigid with the frame of the car, said linkage means being adapted, by means of a tension spring, to automatically maintain the shell-like doors in their opened or closed position and, during the opening or closing operation of the doors, has to clear a dead center position.

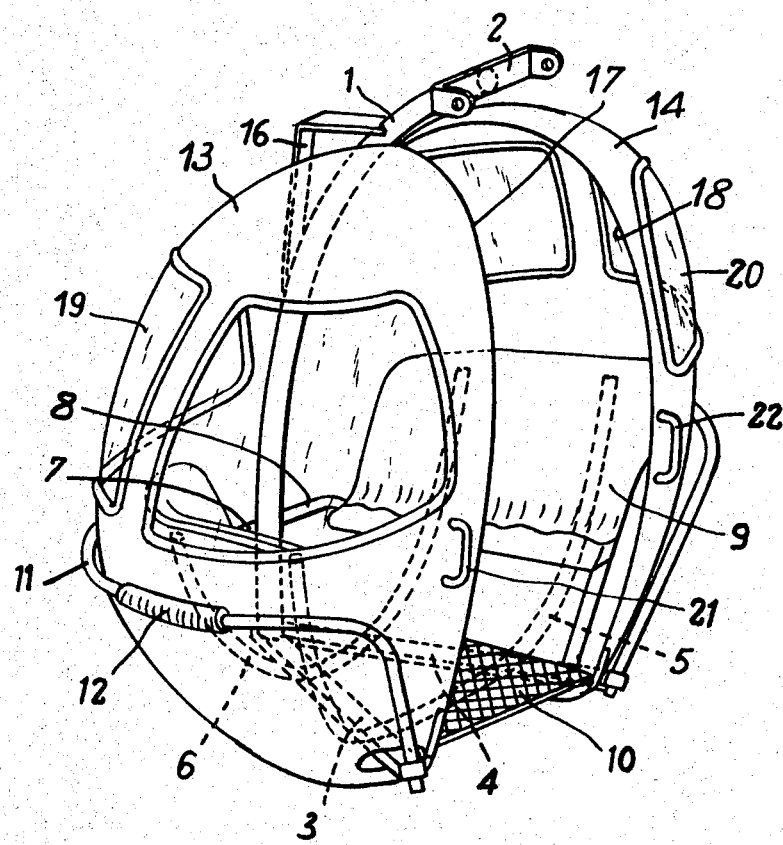

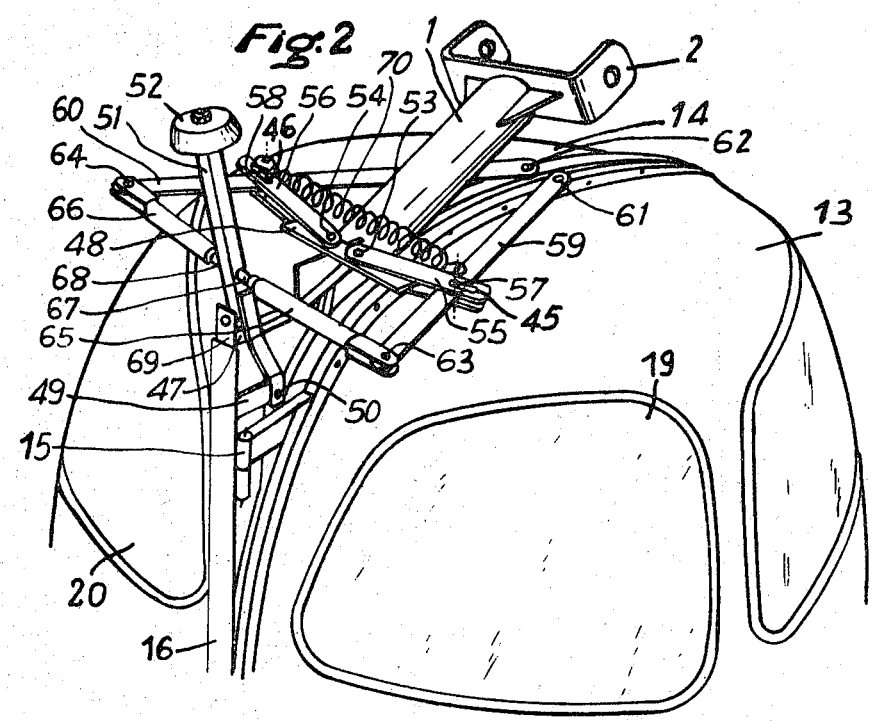
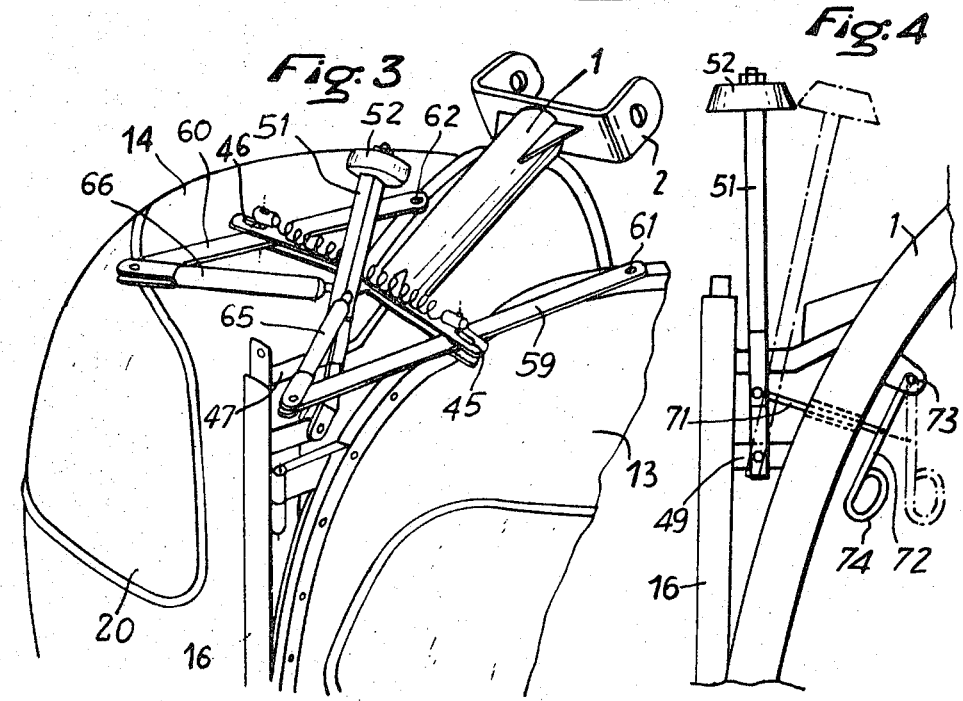
INVENTORS
JEAN POMAGALSKI AND
FRANCIS TAUZIN
By Linton and Linton
ATTORNEYS

TELPHER CAR

This invention relates in general to telpher cars and has specific reference to improvements in telpher cars for transporting passengers under satisfactory conditions from the point of view of safety, roominess and comfort, while greatly facilitating the maintenance thereof.

According to this invention the telpher car comprises a relatively simple mechanism for automatically controlling the opening and closing thereof and for locking the car in its closed condition while permitting, under the action of a stress limiter, the partial opening of the body shells in case of accidental jamming of or by any object during the car-closing movement, and also for aerating the car. Moreover, this mechanism comprises means for manually opening the car from within in case of emergency.

The mechanism for controlling the opening and closing of the car, which is disposed preferably at the top of the car in order to prevent the efforts required for opening and closing the car from detrimentally impairing the stability of the pendular-motion assembly comprising the car and its attachment means for suspending same from the carrier cableway, consists essentially of control roller or skid disposed externally of the car and adapted to be operated in either direction by means of fixed ramps controlling the car opening and closing movements, of a lever or push member supporting said control roller or skid and driven thereby, and of a symmetrical linkage constituting a deformable link motion, responsive to said lever and coupled to said car shells for controlling the opening and closing movements thereof by reacting against fixed points of the car frame structure. The aforesaid linkage is adapted on the one hand to become automatically locked when a dead center position of said linkage is overstepped in the closed car position, so as to positively prevent its reverse operation and, on the other hand, to tension and subsequently release a spring at an intermediate dead center position during each opening and closing maneuver, in order to facilitate through the spring release the completion of the maneuver and permit at the same time a direct action, on the linkage, of said spring acting as a stress limiter at the end of the closing movement. In addition, the control lever, in the locking position obtaining in the closed car position, can be actuated from within the car by means of an internal emergency control lever or handle through the medium of a cable or equivalent member, so that in case of need the car can be opened manually from within.

In order to afford a clearer understanding of this invention a preferred form of embodiment of the telpher car constituting the subject matter thereof will now be described in detail with reference to the accompanying drawing, in which:

FIG. 1 is a perspective view of the telpher car according to this invention, shown in its open position, but without the automatic opening and closing mechanism;

FIG. 2 is a fragmentary perspective view showing the car in its closed position;

FIG. 3 is a view similar to FIG. 2 but showing the car in its open position, and FIG. 4 is a complementary detail view showing more particularly the manual emergency control system.

In the specific form of embodiment illustrated in the drawing the supporting frame structure of the car consists of a main beam 1 disposed in a substantially vertical plane but C-shaped to accommodate the lateral contour of the car on the side opposite to the entrance and exit side thereof. This beam 1 carries at its upper end a suspension strap 2 and at its lower end a pair of V-forming arms 3, 4 supporting the various loads carried in the car proper. This frame structure is completed internally by a subframe comprising two curved frame members 5, 6 also disposed in substantially vertical planes and bearing on said arms 3, 4 and braced by bent tubular members 7, 8 rigid with the main beam 1. This subframe carries the seats 9 and floor 10 of the car. Externally, a tubular assembly 11 rigid with the free ends of arms 3, 4 surrounds the car to constitute a bumper provided, if desired, with any suitable resilient lining such as exemplified at 12.

The reference numerals 13 and 14 designate two opposite shells constituting the cabin or passenger compartment proper of the car structure; these shells are adapted to pivot about a substantially vertical axis and to this end they are mounted on hinges such as 15 carried by an upright 16 forming an integral part of the carrier frame structure and disposed along the car side opposite to the opening and closing side. The shells 13 and 14 have no inner bottom and constitute together an enclosure separate from the frame structure and from the loads contained in the car. In the closed position the edges 17 and 18 of these shells 13 and 14, which are advantageously lined with suitable rubber strips, contact each other in the vertical transverse plane of the car, and in the open position these shells diverge away from each other about their vertical hinge axis.

Both shells 13 and 14 are for example molded to a suitable curved configuration from rigid plastic material having a considerable mechanical strength, and each shell has formed in its upper portion a two-section broad window 19, 20 receiving a curved sheet of transparent synthetic material so as to afford a panoramic view to the passengers seating in front of this window and looking outside. The shells 13 and 14 may be provided, on the entrance side, with handles 21 and 22.

In the vertical joint plane of these two shells 13 and 14, and above the shells (see FIGS. 2 and 3) the upright 16 carries a horizontal frame support 47 having at its end a horizontal guide plate 48 extending at right angles to said joint plane. Moreover, below said support 47, the upright 16 carries a parallel frame support 49 having at its outer end a horizontal pivot pin 50 connecting this support 49 to the lower forked end of a control lever 51 carrying in turn a control roller or skid 52 at its upper end.

Approximately in the central portion of the plate 48 a pair of pivot pins 53 and 54 provide a pivotal connection for a pair of double symmetrical horizontal arms 55 and 56 consisting each of a pair of superposed elements disposed above and beneath the guide plate 48, respectively. The outer ends of these arms 55 and 56 have elongated holes 45 and 46 formed therethrough; these holes are engaged by pivot pins 57 and 58 for pivotally connecting thereto the intermediate portions of a pair of horizontal symmetrical links 59 and 60. The ends of these links which lie on the opening side of the car are pivoted at 61, 62 to the corresponding shells 13 and 14, in the vicinity of their joint plane. The opposite ends of the same links 59 and 60 are pivotally connected by means of pins 63 and 64 to the ends of two symmetrical rods 65 and 66 extending towards the joint plane of the shells, the other ends of these rods 65 and 66 being connected through adjustable ball-and-socket joints 67 and 68 to the above-mentioned control lever 51.

In the closed car position links 59 and 60 diverge from their pivotal connections 61 and 62 on the shells, and the arms 55 and 56 form an obtuse angle opening towards the entrance side, with the rods 65 and 66 forming another obtuse angle also opening towards the entrance side, said lever 51 abutting on the hinge side of said shells against a stop 69, consisting for example of a plastic block, carried by the upper end of the upright 16. A suitably calibrated coil tension spring 70 is tensioned with a certain degree of prestress between the pivot pins 57 and 58 so as to urge them against each other.

The roller 52 is designed for engaging fixed control ramps (not shown) at each station provided along or at the ends of the telpher line, in order to control the opening and closing of the car. The ramps controlling the car-opening movement push the roller 52 towards the entrance side, and the car-closing ramps move the roller 52 in the opposite direction.

When the lever 51 is actuated to open the car as just described it pivots about the pin 50, thus moving the ball-and-socket joints 67 and 68 towards the entrance side of the car, whereby the rods 65 and 66 will move beyond their aligned position and then exert a traction on the ends 63 and 64 of links 59 and 60. These ends are moved towards each other when the links are rotated about their intermediate pivotal mountings 57 and 58, so that their attachment points 61 and 62 to the shells 13 and 14 move away from each other, thus opening the shells and therefore the car. Another consequence of this car opening movement is that the arms 55 and 56 are pivoted about their fixed pivot pins 53 and 54, so that these arms move firstly to a position of mutual alignment while tensioning the spring 70, and then form an oppositely-directed angle and permit the contraction of spring 70 to provide the car opening position shown in FIG. 3 wherein the lever 51 abuts against the spring 70. It is clear that the end of the car opening movement is assisted by the release of the previously tensioned spring 70.

Now if the car, just before leaving a station, engages a ramp controlling the closing movement, this ramp will act upon the roller 52 in the opposite direction and the reverse movement will be obtained so that the component elements of the car will move from the position shown in FIG. 3 to the position shown in FIG. 2, the spring 70 being then tensioned until the arms 55 and 56 are in mutual alignment, this spring being subsequently released to assist in completing the closing movement whereby the rods 65 and 66 clear their position of mutual alignment to form an obtuse angle opening towards the entrance of the car. The consequence of the clearing of the aligned position of rods 65 and 66 is that the shells constituting the car body are locked in their closed position. In fact, it makes the mechanism irreversible in case of accidental tampering, for any action exerted against the car shells in an attempt to open same would tend to move the pivot points 63 and 64 towards each other, while urging the lever 51 with a greater force towards its closing position.

On the other hand, for instance in case an object were jammed between the edges 17 and 18 of the car shells during the closing movement, the shells can be moved to a partially open position by exerting thereon a manual effort tending to move the pivot points 61 and 62 away from each other. This maneuver is permitted by the movement of the pivot pins 57 and 58 in the elongated holes 45 and 46 formed in the outer ends of arms 55 and 56, thus overstressing the stress limiting spring 70. When the object thus jammed between the two shells has been removed, the shells close automatically under the tension of spring 70. It will be readily understood that this movement of the shells to a partially open position can also be obtained when it is desired to aerate the interior of the car.

To permit an emergency opening from within the car, the lever 51 (FIG. 4) is connected through a cable 71 extending through the main beam 1 to an inner emergency control lever 72 pivoted at 73 and provided with a handle 74 so that when this emergency lever is pulled from within the external lever 51 is actuated to start the opening movement by causing the rods 65 and 66 to clear or overstep their mutually aligned position, thus permitting to continue the opening movement by acting upon the shells 13 and 14.

It will be seen that the telpher car constituting the subject matter of the present invention comprises an automatic opening and closing control mechanism which is as simple as possible and meets completely all safety requirements concerning a completely automatic operation both in the opening direction and in the closing direction, provides a safety locking feature in the closed position, and permits on the one hand a partial opening of the car for removing for example an object jammed between the shells, and on the other hand an emergency manual operation controlled from within the car.

Moreover, each maneuver, in either direction, will first stress a spring acting as a stress limiter and subsequently permit its release on either side of an intermediate position, so that the spring will positively assist the maneuver started by the automatic control system. This result is advantageously obtained by using a prestressed tension coil spring disposed between the ends of two symmetrical opposite arms adapted during a maneuver to clear a position of mutual alignment constituting a dead center whereat the spring has its maximum tension.

It will be readily understood by any anybody conversant with the art that this description should not be construed as limiting the scope of the invention since it relates to a single and preferred form of embodiment of the invention to which various modifications and variations may be brought without departing from the spirit and scope of the invention as set forth in the appended claims.

We claim:

1. A telpher car for use with fixed ramps comprising a pair of shells capable of closing together along a substantially vertical transverse plane thereof, a vertical hinge connecting said shells for pivoting on an axis substantially tangent to said shells, on the opposite side to the lateral entrance side of the car, a frame structure for supporting said shells connected to said hinge and disposed along said vertical axis, seat and floor means connected to and supported directly by said frame structure, means at the upper portion of said frame structure for suspending the telpher car from its cableway, a control lever pivotally mounted on said frame structure, a control member carried by the upper end of said control lever and responsive to the fixed ramps for actuating said control lever in one or the other direction, a guide plate rigid with said frame, a pair of laterally extending, substantially horizontal double arms having their inner ends pivoted to said guide plate and their outer ends formed with holes, pivot pins extending into said holes, a pair of corresponding links each having one end pivotally connected to the top of one of said shells and one of said pins mounted on a medial portion thereof, lateral rods each having an outer end pivotally connected to the opposite end of one of said links, ball-and-socket joints connecting the inner ends of said lateral rods to said control lever, and a tension spring interconnecting, with a predetermined degree of prestress, said pivot pins engaging said holes, said arms being normally urged by said spring to a position in which they form an obtuse angle direction towards the opening side of said car in the closed shell position, said arms being also adapted, when said control lever is actuated through its control member engaging a fixed ramp, to clear a dead center position in which said arms are aligned and to assume an over center position in which said arms form an obtuse angle directed towards said hinge means, opposite said opening side, to hold said shells in their open position.

2. A telpher car as set forth in claim 1, wherein said holes formed at the outer ends of said horizontal double arms have an elongated shape in order to permit, when said shells are in their closed position a partial opening of these shells.

3. A telpher car as set forth in claim 1, wherein an emergency manual control lever is pivotally mounted inside the car and connected through cable means to said control lever to permit the opening of said shells in case of an emergency.